United States Patent [19]

Yamashita et al.

[11] Patent Number: 5,792,520
[45] Date of Patent: Aug. 11, 1998

[54] METHOD OF MANUFACTURING A REFLECTOR

[75] Inventors: Akira Yamashita, Hiratsuka; Koichi Furukawa, Tokyo; Teruaki Orikasa, Yokohama; Noriaki Goto, Yamanashi-ken; Shigeki Matsunaka, Yokohama; Yoshitaka Kawada, Tokyo, all of Japan

[73] Assignee: Kabushiki Kaisha Toshiba, Kawasaki, Japan

[21] Appl. No.: 701,267

[22] Filed: Aug. 22, 1996

[30] Foreign Application Priority Data

Aug. 24, 1995 [JP] Japan .................... 7-215594
Aug. 24, 1995 [JP] Japan .................... 7-215595

[51] Int. Cl.6 .................................... B05D 3/00
[52] U.S. Cl. .................. 427/555; 427/162; 427/264; 427/270; 427/272; 427/282; 427/383.1; 427/385.5; 427/404; 427/407.1; 427/595
[58] Field of Search .................... 427/555, 595, 427/162, 264, 270, 272, 282, 383.1, 385.5, 404, 407.1

[56] References Cited

U.S. PATENT DOCUMENTS 4,835,087  5/1989  Bielli et al. ............... 430/318
4,860,023  8/1989  Halm ......................... 343/912
5,364,493 11/1994  Hunter, Jr. et al. ........ 156/630

FOREIGN PATENT DOCUMENTS

| | | |
|---|---|---|
| 0 575 848 | 12/1993 | European Pat. Off. . |
| 0 575 850 | 12/1993 | European Pat. Off. . |
| 2 598 339 | 11/1987 | France . |
| 44 29 522 | 3/1995  | Germany . |
| 61-42438  | 9/1986  | Japan . |
| 62-11291  | 1/1987  | Japan . |
| 62-221188 | 9/1987  | Japan . |
| 5-57762   | 8/1993  | Japan . |
| 5-57764   | 8/1993  | Japan . |
| 6-112626  | 4/1994  | Japan . |
| 6-226477  | 8/1994  | Japan . |
| 6-260739  | 9/1994  | Japan . |

*Primary Examiner*—Bernard Pianalto
*Attorney, Agent, or Firm*—Oblon, Spivak, McClelland, Maier & Neustadt, P.C.

[57] ABSTRACT

A copper film layer and a resin film are sequentially layered on a skin material, the resin film is irradiated with a laser beam so as to be removed, a mask is formed on the copper film layer by use of the residual of the resin film, thereafter, an etching process is provided thereto, so that a copper film layer pattern is formed on the reflective surface of the skin material.

6 Claims, 8 Drawing Sheets

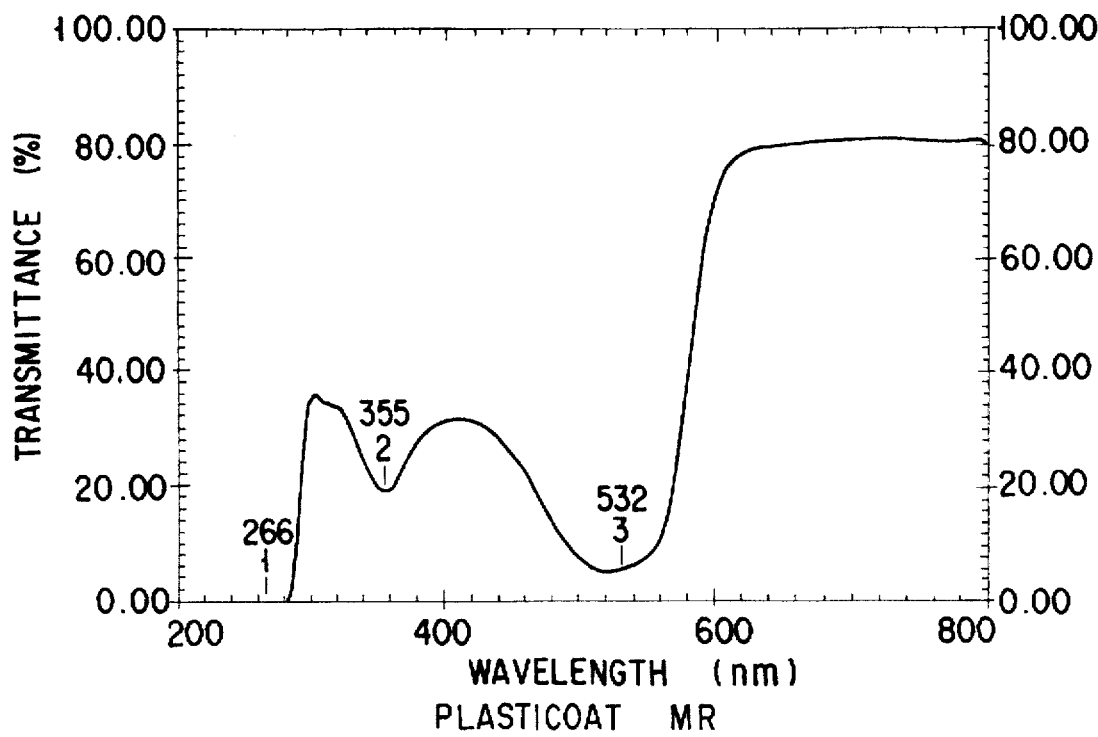
PLASTICOAT MR
F I G. 7
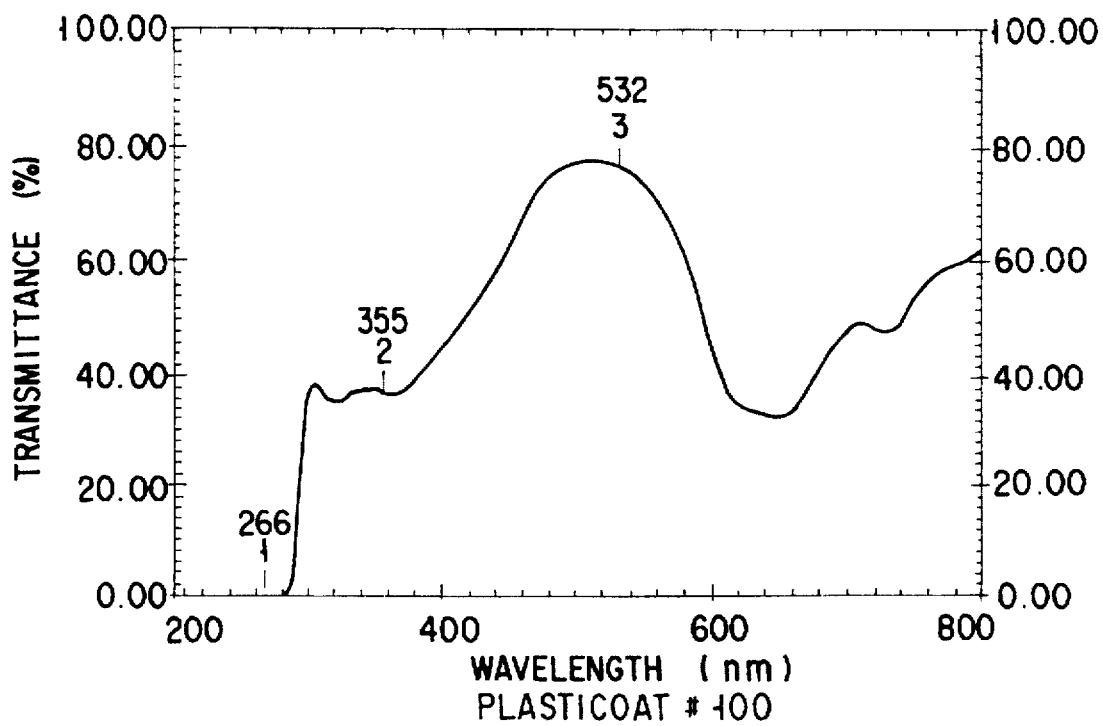
PLASTICOAT #100
F I G. 8

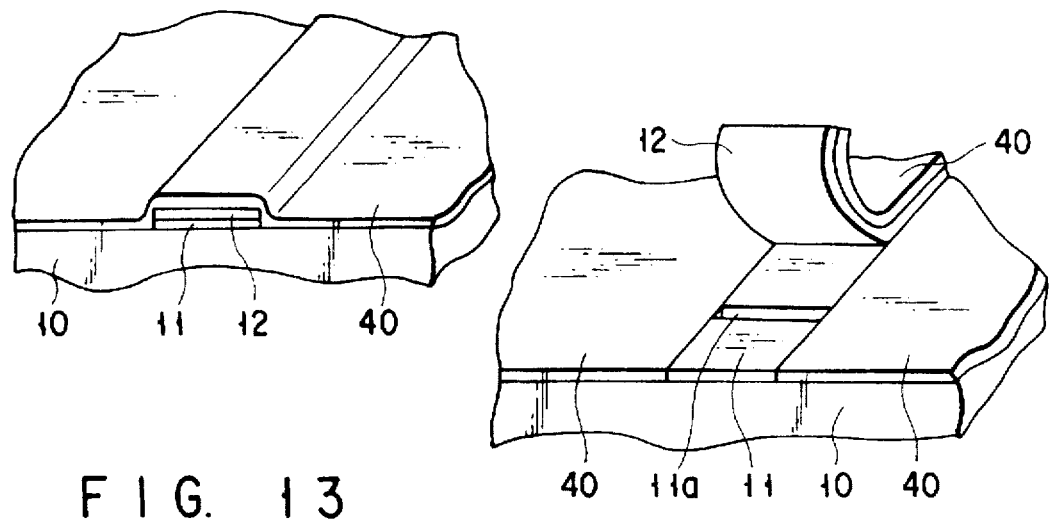
FIG. 13
FIG. 14
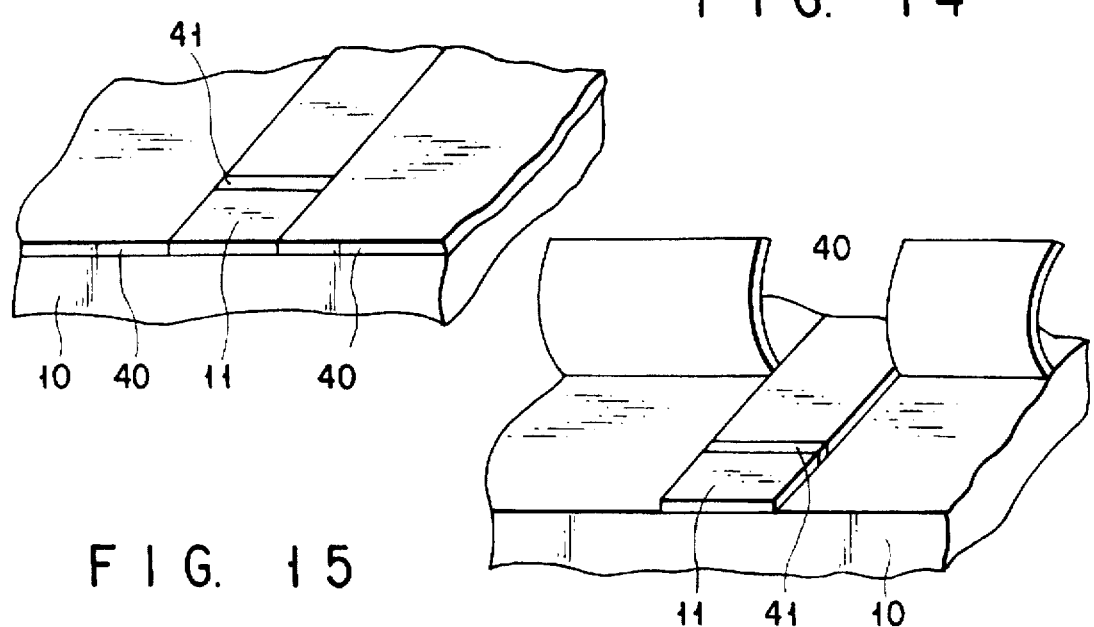
FIG. 15
FIG. 16
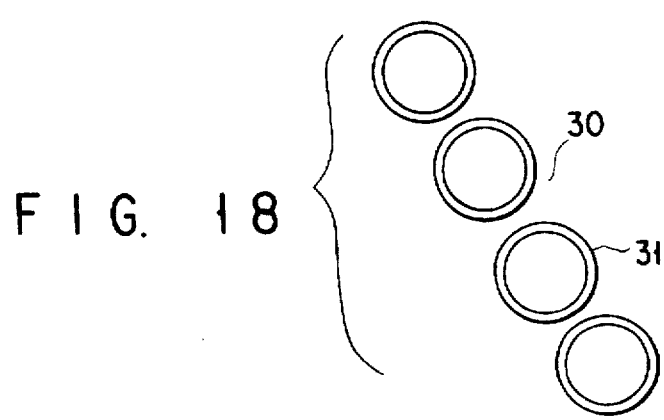
FIG. 18

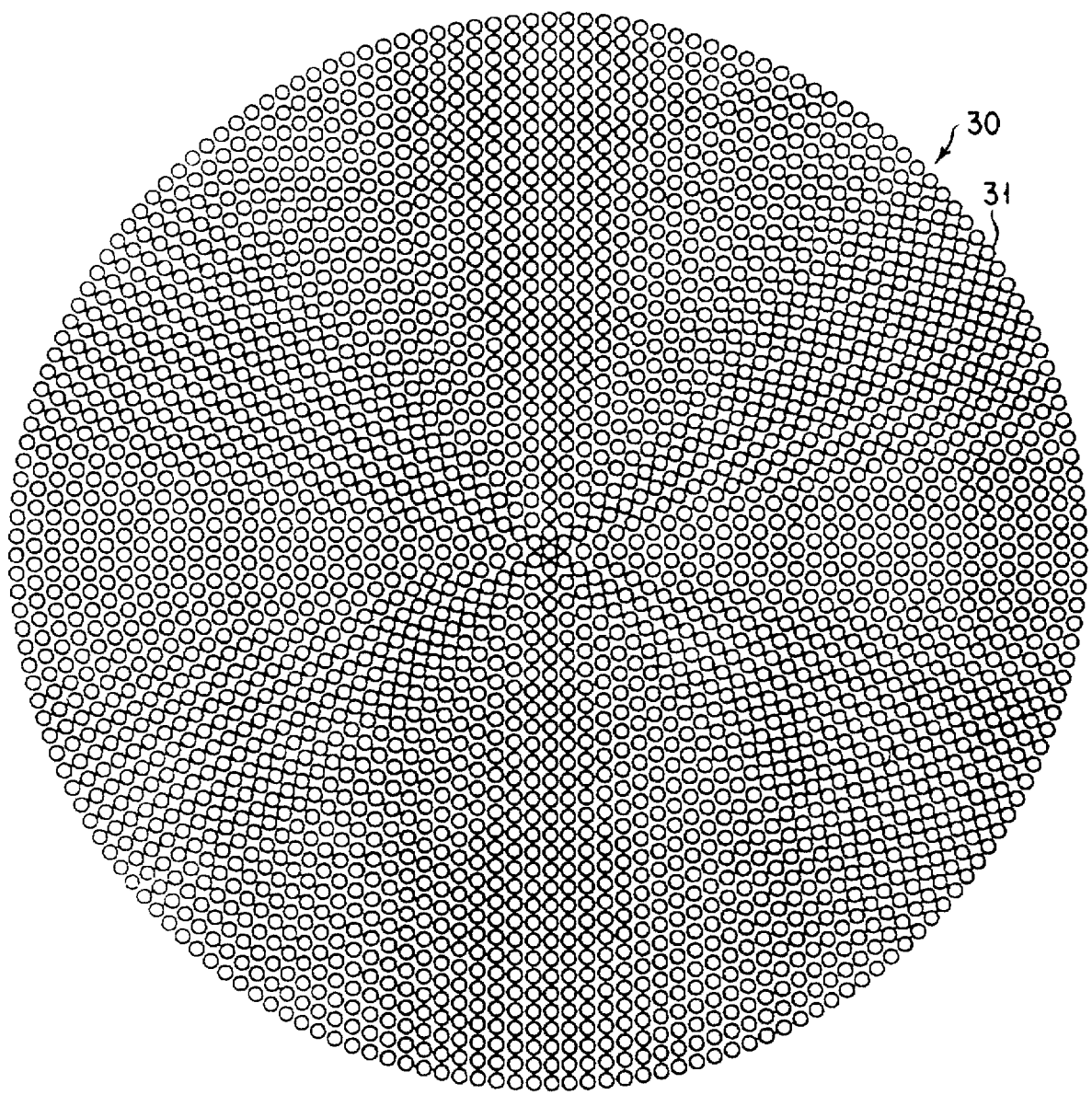
F I G. 17

METHOD OF MANUFACTURING A REFLECTOR

BACKGROUND OF THE INVENTION

1. Field of the Invention

The present invention relates to a method of manufacturing a reflector mounting on a space flying object such as an artificial satellite, etc.

2. Description of the Related Art

Conventionally, there is a dual grid reflector system. Specifically, a front reflector and a rear reflector are mounted on an antenna system to be overlapped with each other. By these reflectors, the so-called V-polarized wave or H-polarized wave is selectively reflected so as to radiate into a free space. In the dual grid reflector system, a metal film layer pattern (grid line) is formed to be perpendicular to each of reflective surfaces of the front and rear reflectors. Feeding sections are formed to be opposite to the front and rear reflectors, respectively. Each of the feeding sections radiates the V-polarized wave, which is parallel to the grid line, or H-polarized wave to be selectively reflected to be emitted to the free space.

The V-polarized wave has a field component, which is substantially parallel to the metal film layer pattern of the front reflector. If the V-polarized wave is radiated from one feeding section, the V-polarized wave is reflected at the metal film layer pattern of the front reflector. The H-polarized wave has a field component, which is substantially parallel to the metal film layer pattern of the rear reflector. If the H-polarized wave is radiated from the other feeding section, the H-polarized wave is transmitted through the front reflector so as to be reflected at the metal film layer pattern of the rear reflector.

For example, in Japanese Patent Application KOKOKU Publication Nos. 5-57762 and 5-577641, and Japanese Patent Application KOKAI Publication No. 6-260739, the method of manufacturing such a reflector is disclosed. The manufacturing method disclosed in these publications is as follows.

An electrically conductive film is formed on a skin material, which is made of an insulation substrate constituting a reflector body. The conductive film is coated with liquid photosensitive resist. Then, the photosensitive resist on the conductive film is exposed with a laser beam. Then, the photosensitive resist is developed to remove a portion where no irradiation of the laser beam is provided. The exposed conductive film is etched so as to form a predetermined metal film layer pattern.

However, in the above-mentioned method, after the photosensitive resist is applied on the skin material, exposing and developing treatments must be provided. Then, large-sized facilities for development, resist removal, a darkroom, etc. are needed in manufacturing the reflectors. Due to this, the reflectors are subjected to limitations in enlarging their diameters. Also, in the developing process, an image distortion occurs. Due to this, the accuracy of the manufactures is degraded by a size error due to the image distortion in enlarging the diameters of the reflectors.

Japanese Patent Application KOKAI Publication No. 6-226477 discloses the following manufacturing method.

A metallized layer of a base layer is coated with a resistive coat. The resistive coat is covered with a photomask, which is called reticle plate. The resistive coat is irradiated with a laser beam through the photomask so that the resistive coat is removed in accordance with a pattern shape. Then, an etching process is provided so as to remove a metallized layer of a base layer where the resistive coat is removed. Thereafter, the resistive coat formed on the metallized layer is removed so as to form a metallized layer pattern.

However, in the above-mentioned manufacturing method, since the photomask is used to remove the resistive coat, the photomask must be replaced in accordance with the pattern shape.

Also, the optical width of the laser beam is limited, and the resistive coat is removed in accordance with the large pattern shape by use of the photomask. Due to this, the processing pattern shape is limited.

Moreover, there is difficulty in transforming the coordinates, which are necessary for processing the pattern on a curved surface. In other words, it is difficult to process a graph in which a basic pattern is projected on a projection surface. Therefore, it is difficult to obtain the accurate pattern shape, which is required in the dual grid reflector, and a frequency selective reflector.

Particularly, the above-mentioned problem is one of the important problems in enlarging the diameter of the reflector, which is required in the filed of the space development.

SUMMARY OF THE INVENTION

An object of the present invention is to a method for manufacturing a reflector, which can easily manufactured with high accuracy.

In order to attain the above object, there is provided a method for manufacturing a reflector comprising:

a first step of forming a metal film layer on an insulation substrate constituting a reflective surface;

a second step of applying resin to the metal film layer of the insulation substrate so as to form a resin film;

a third step of irradiating the resin film covering the metal film layer with a laser beam, removing the resin film, and masking the metal film layer with the resin film, and the third step including a step of three-dimensionally controlling a laser irradiation section of the laser beam and the insulation substrate so as to irradiate the resin film covering the metal film layer with the laser beam, thereby forming a mask of the resin film on the metallic film layer in accordance with a pattern shape;

a fourth step of etching the metal film layer exposed on the insulation substrate masked in the third step so as to be removed; and a fifth step of removing the resin film covering the metal film layer of the insulation substrate etched in the fourth step so as to expose a metal film layer pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 7 is a characteristic view showing the spectral characteristics of strippable paint;

FIG. 8 is a characteristic view showing the spectral characteristics of strippable paint;

FIG. 13 is a partially perspective view showing a manufacturing step when a copper film layer is formed of copper foil;

FIG. 14 is a partially perspective view showing a manufacturing step sequentially from FIG. 13;

FIG. 15 is a partially perspective view showing a manufacturing step sequentially from FIG. 14;

FIG. 16 is a partially perspective view showing a manufacturing step sequentially from FIG. 15;

FIG. 17 is a plane view showing a frequency selective reflector to which the present invention is applied;

FIG. 18 is a partially enlarged plane view of a copper film pattern of FIG. 17;

DETAILED DESCRIPTION OF THE PREFERRED EMBODIMENTS

The embodiments of the present invention will be explained with reference to the drawings.

Figure 1:
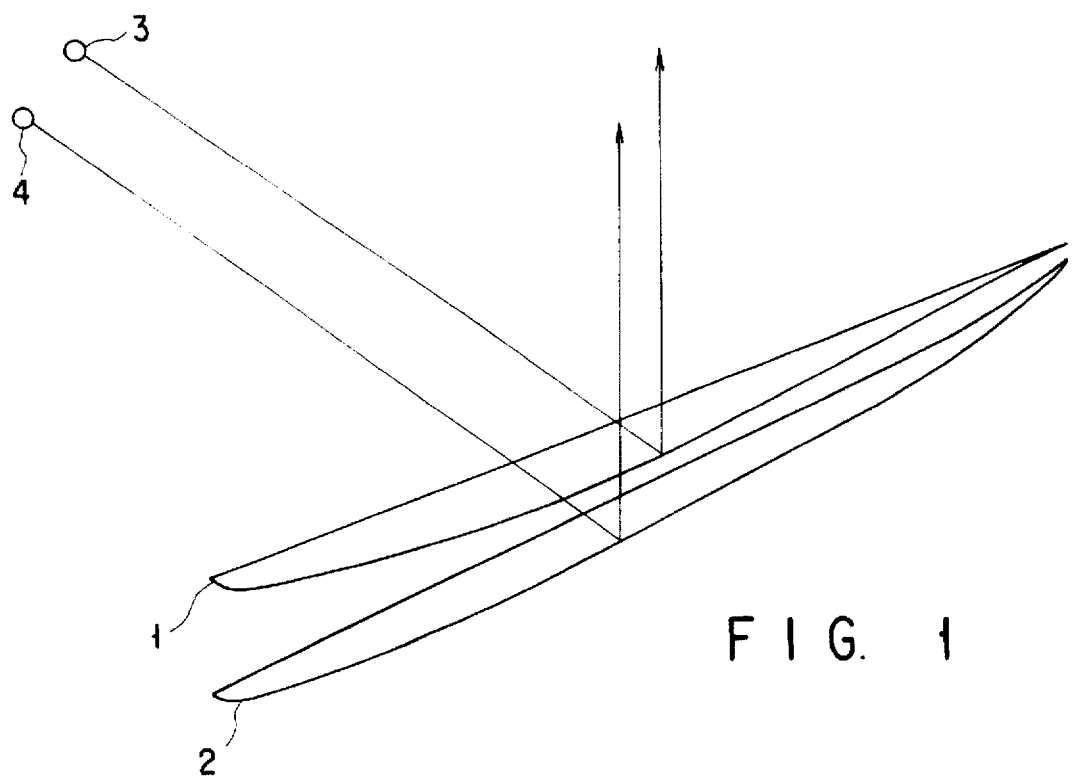
FIG. 1 is a side view showing the concept of an antenna system, which is applied to the present invention.
Figure 2:
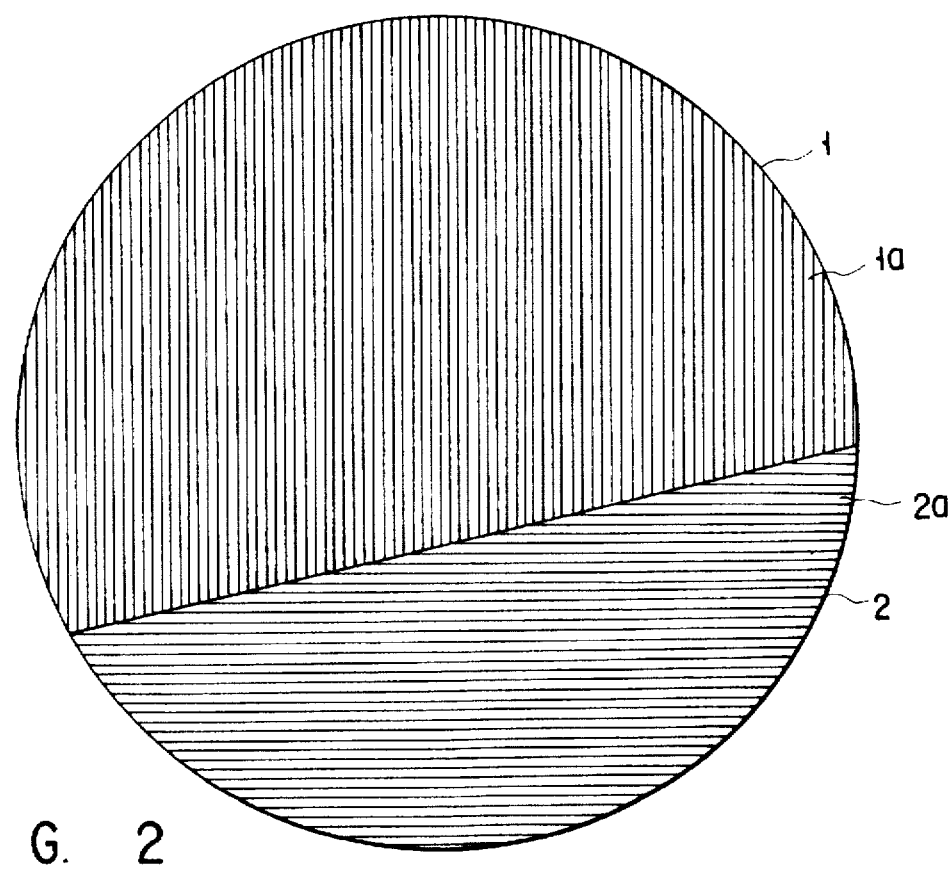
FIG. 2 is a plane view showing a reflector of the antenna system of FIG. 1.

Prior to the explanation of the manufacturing method of the reflector of the first embodiment, the following will explain an antenna system of a polarized wave selective type applied to the present invention with reference to FIGS. 1 and 2.

First and second reflectors 1 and 2 are curved and overlapped with each other along directivity, thereby forming front and rear reflectors as shown in FIG. 1. First and second feeding sections 3 and 4 are arranged to be opposite to the reflective surfaces of the reflectors 1 and 2, respectively. Metal film layer patterns (grid lines) 1a and 2a are formed on the reflective surfaces of the reflectors 1 and 2 to be perpendicular to each other. Each of the feeding sections 3 and 4 radiates a V-polarized wave, which is parallel to the grid line, or an H-polarized wave to be selectively reflected at the patterns 1a and 2a and to be emitted to a free space.

The V-polarized wave has a field component, which is substantially parallel to the metal film layer pattern 1a of the first reflector 1. If the V-polarized wave is radiated from the first feeding section 3, the V-polarized wave is reflected at the metal film layer pattern 1a of the reflector 1. The H-polarized wave has a field component, which is substantially perpendicular to the metal film layer pattern 1a of the reflector 1 (field component, which is substantially parallel to the metal film layer pattern 2a of the second reflector 2). If the H-polarized wave is radiated from the second feeding section 4, the H-polarized wave is transmitted through the reflector 1 so as to be reflected at the metal film layer pattern 2a of the reflector 2.

Figure 3:
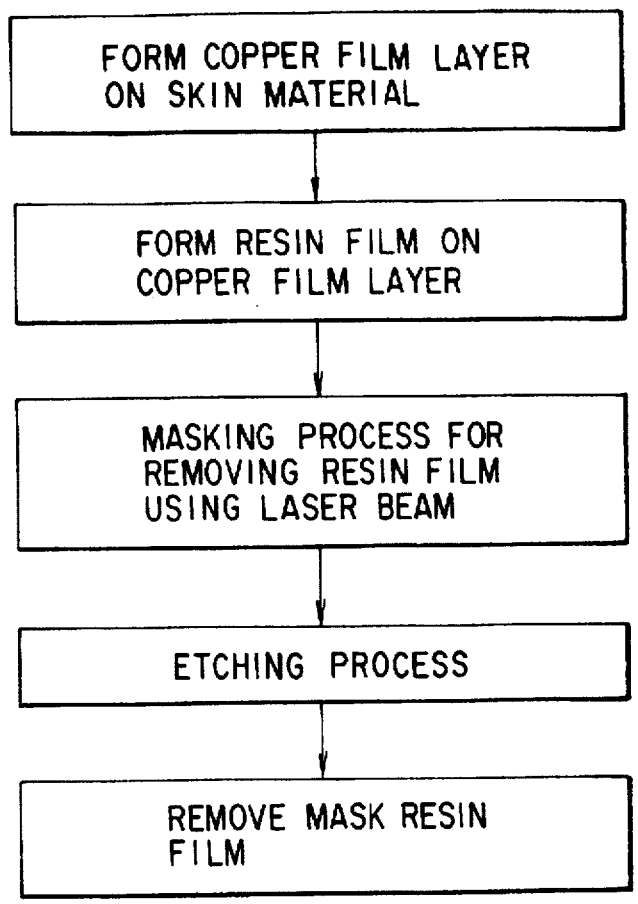
FIG. 3 is a flow chart showing the steps of the manufacturing method of the reflector of the embodiment of the present invention.

The manufacturing method of the reflector of one embodiment of the present invention will be explain with reference to FIG. 3.

Figure 4:
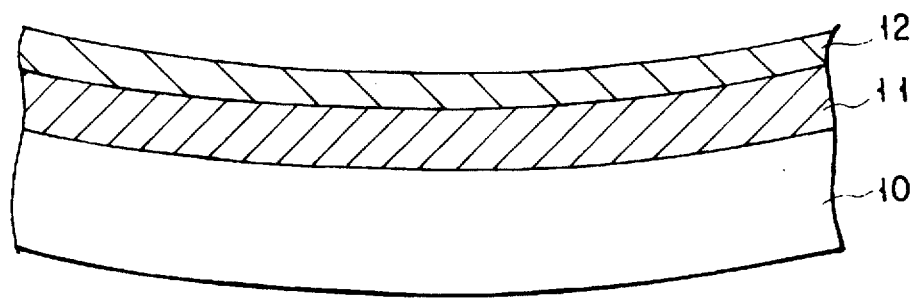
FIG. 4 is a cross sectional view showing a part of a skin material manufactured in FIG. 3.

In a first step, a skin material 10 constituting the reflector is formed to have a reflector shape having a predetermined curved surface (see FIG. 4). The reflector shape is formed of an insulation substrate, for example, a complex of aramid fiber/epoxy resin. A metal film layer, e.g., copper foil is adhered onto the entire reflective surface so as to form a copper film layer 11 on the skin material 10. In a second step, the copper film layer 11 is coated with the so-called strippable resin having a good stripping property, which is called strippable paint, so that a resin film 12 is layered thereon.

For example, in this case, a strippable resin, which contains vinyl copolymer resin, made by Daikyo Kagaku, as a main component, is used as a resin film 12.

For example, dye such as red is mixed with the strippable resin so as to set a predetermined color. Then, the strippable resin is applied onto the copper film layer 11 so as to form the resin film 12. In this case, since the coating state can be judged by watching the color, an easy coating work can be realized. The strippable resin can be easily stripped manually without using solvent.

Figure 5:
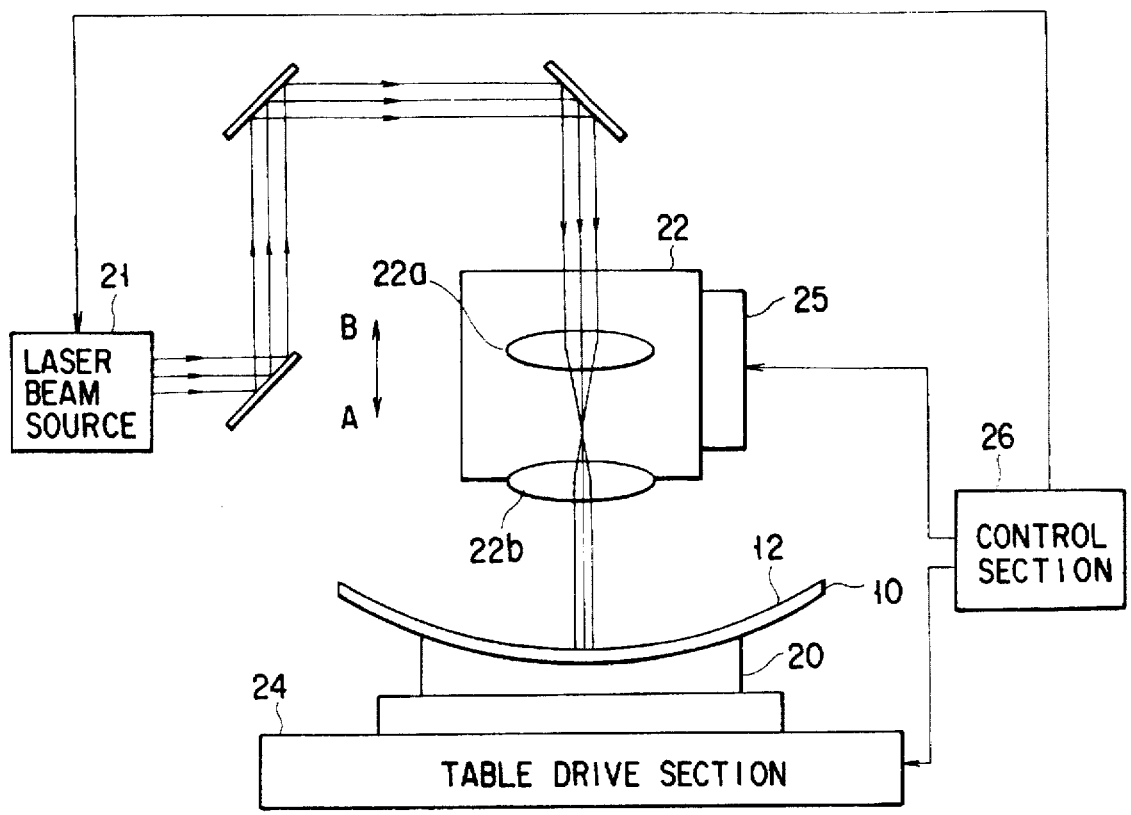
FIG. 5 is a block plan showing a pattern forming device used in FIG. 3.
Figure 6:
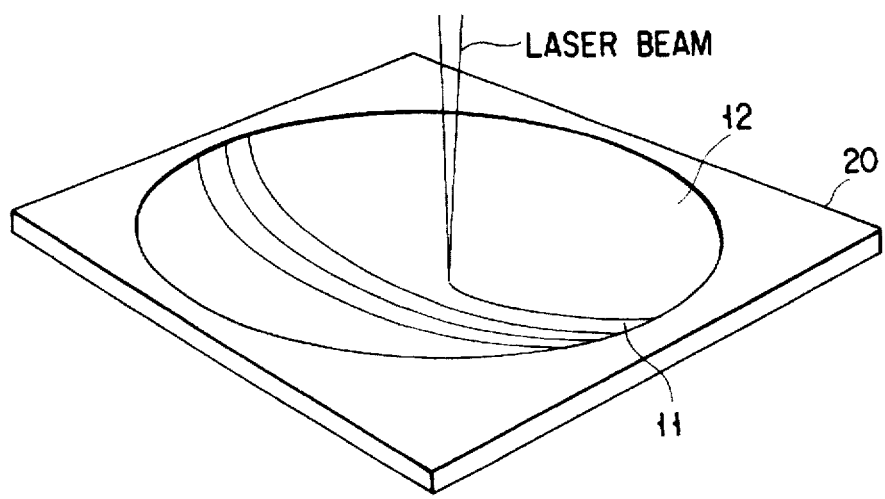
FIG. 6 is a perspective view showing a pattern forming state of FIG. 3.

Then, in an etching mask forming step, the skin material 10 is attached to an X-Y table 20 constituting an etching mask forming device as shown in FIG. 5. In this case, the resin film 12, serving as an upper surface, is formed on the skin material 10. The resin film 12 is irradiated with a laser beam such as a KrF excimer laser beam from a laser beam source 21 through a laser beam irradiation section 22. Thereby, a predetermined portion of the resin film 12 is removed, and the so-called patterning is performed (see FIG. 6). An unremoved portion of the resin film 12 is left on the copper film layer 11. The residual is used as an etching mask for blocking, e.g., the copper film pattern, which is called grid line.

By providing the predetermined color to the resin film 12, the etching mask forming state can be easily confirmed, and the accuracy of the etching mask forming and the yield can be improved.

The X-Y table 20 is connected to a table drive section 24 so as to be two-dimensionally driven in X and Y axial directions by the table drive section 24. The laser beam irradiation section 22 is provided to be opposite to the X-Y table 20.

The laser beam irradiation section 22 is provided to be opposite to the X-Y table 20 to be movable in directions of arrows A and B through an optical drive section 25. The laser beam source 21 is optically connected to an input side of the section 22. The laser beam irradiation section 22 is formed of, for example, a well-known telecentric optical system. The laser beam irradiation section 22 is irradiated with the laser beam sent from the laser beam source 21 onto the resin film 12 of the skin material 10 of the table 20 with high accuracy. In this case, the laser spot is little misconverged.

The resin film 12 of the copper film layer 11 of the skin material 10 is irradiated with the laser beam, so that the predetermined portion of the resin film 12 is removed. The unremoved resin film 12 on the copper film layer 11 exists as an etching mask for blocking the copper film layer pattern. In this case, if the thickness of the resin film 12 is 20 μm, the resin film 12 is irradiated with 40 laser beam shots at energy density 1 j/cm$^2$ to remove the resin film 12.

A control section 26 is connected to the table drive section 24 and the optical drive section 25. The control section 26 controls the table drive section 24 and the optical drive section 25. The control section 26 three-dimensionally drives the laser irradiation positions of the section 22 and the resin film 12 of the skin material 10 of the table 20 in accordance with the shape of the curved surface. Then, a portion of the resin film 12 excepting a predetermined pattern is irradiated with the laser beam sent from the section 22 so as to be removed.

The residual resin film 12 is left on the copper film layer 11 of the skin material 10 in accordance with the copper film layer pattern. The copper film layer pattern is masked by the resin film 12. Therefore, the predetermined portion of the resin film 12 is removed with high accuracy, and the residual resin film 12 is formed on the copper film layer 11 to be used as an etching mask for the copper film layer pattern.

The laser beam source 21 is connected to the control section 26. The laser beam source 21 outputs the laser beam to the laser irradiation section 22 in cooperation with the table drive section 24 and the optical drive section 25.

As mentioned above, the etching mask using the resin film 12 is formed on the copper film layer 11. Then, the exposed copper film layer 11 is irradiated with 10 or more laser beam shots. Thereby, the oxide film on the exposed copper film layer 11 and the re-adhesion material of the resin film 12 are removed so as to clean the copper film layer 11.

By the cleaning process after removing the resin film 12, the copper film layer 11 can be etched with high accuracy at stable etching velocity in a next etching process.

The skin material 10 is etched with well-known etchant e.g., ferric chloride, so that the exposed copper film layer 11 is etched to be removed. In this case, the copper film layer 11 is stably etched by the copper film layer cleaning process, which is executed after removing the resin film 12.

Thereafter, the resin film 12 constituting the etching mask is stripped from the copper film layer 11 so as to be removed, and a copper film layer pattern is formed on the skin material 10.

Then, the skin material 10 is adhered to one surface of a honeycome core (not shown), formed of, e.g., a composite of aramid fiber/epoxy resin, with an adhesive film. Also, skin material having the same material as the skin material 10 is adhered to the other surface of the honeycome core with the film adhesive. Thereby, a reflector body, which is called dual reflector is manufactured.

In this case, a reflective surface including the copper film layer pattern of the skin film 10 of the reflector body is coated with a protection film (not shown) so as to protect the reflective surface. The reflective surface including the cop-per film layer pattern may be coated with the protection film before assembling the reflector body.

In removing the resin film 12 and/or cleaning the copper film layer 11 with the direct radiation of the laser beam, the pulse width of the laser beam is extremely short, e.g., 10 nm. Due to this, the stable removal can be realized without exerting heat damage upon the skin material 10. Then, it is confirmed that the radio transmission characteristic of the reflector is maintained in its initial characteristic state.

According to the above-mentioned reflector manufacturing method, the copper film layer 11 and the resin film 12 are sequentially formed on the skin material. Then, the part of the resin film 12 is irradiated with the laser beam to be removed. Then, the etching mask is formed on the copper film layer 11 by the residual part of the resin film 12, and the copper film layer pattern is formed on the reflective surface of the skin material 10 by the etching process.

According to the present invention, there are provided the etching mask forming process in which the part of the resin film 12 removed with the laser beam so as to form the etching mask and the etching process. By providing only the etching mask forming facilities and the etching facilities, the copper film layer pattern can be easily and accurately formed. Therefore, as compared with the conventional method, the manufacture of the reflector can be simplified, and the diameter of the reflector body can be easily enlarged.

Moreover, the etching mask using the resin film 12 can be formed on the copper film layer 11 without using the reticle plate (photomask). Thereby, the pattern forming work can be simply and easily realized.

Figure 9:
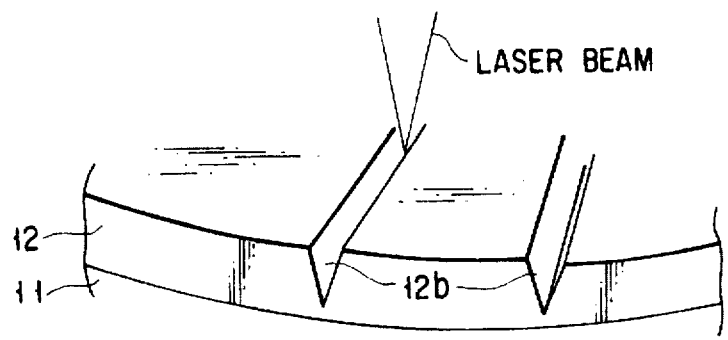
FIG. 9 is a perspective view showing a part of the other embodiment of the present invention.
Figure 10:
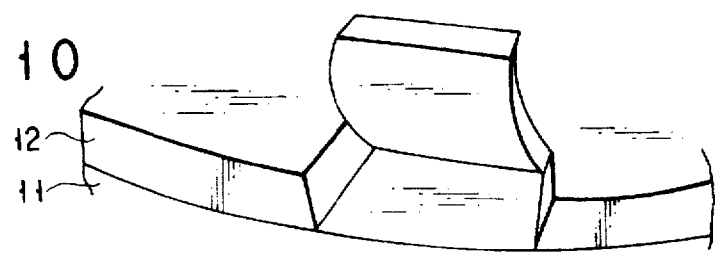
FIG. 10 is a perspective view showing a stripping work of a resin layer of FIG. 9.

In the above-explained embodiment, the resin film 12 on the copper film layer 11 was directly irradiated with the laser beam, and the etching mask using the resin film 12 was formed on the copper film layer 11 so as to provide the etching process. However, the present invention is not limited to the above etching mask forming method. For example, the etching mask may be formed on the copper film layer 11 as shown in FIGS. 9 and 10.

Specifically, the resin film 12 formed on the copper film layer 11 is irradiated with the laser beam in a slit form. The resin film 12 is removed in the slit form so as to form a pair of slits 12b and 12b (FIG. 9). Then, the resin film 12 between the slits 12b and 12b is stripped to be removed. Thereby, the etching mask using the resin film 12 is formed on the copper film layer 11 (FIG. 10) so as to provide the etching process.

Substantially similar to the above-mentioned embodiment, by providing only the etching mask forming facilities and the etching facilities, the copper film layer pattern can be easily and accurately formed. Also, the diameter of the reflector body can be easily enlarged.

Moreover, since the laser beam irradiation area is minimized and the removing area of the resin film 12 can be largely set, the resin film 12 removed with the laser beam can be prevented from being adhered to the etching processing surface again, so that more effective advantages can be expected.

Regarding the adhesion of the resin film 12 again at the time of forming the etching mask, the following point is experimentally confirmed.

Figure 11:
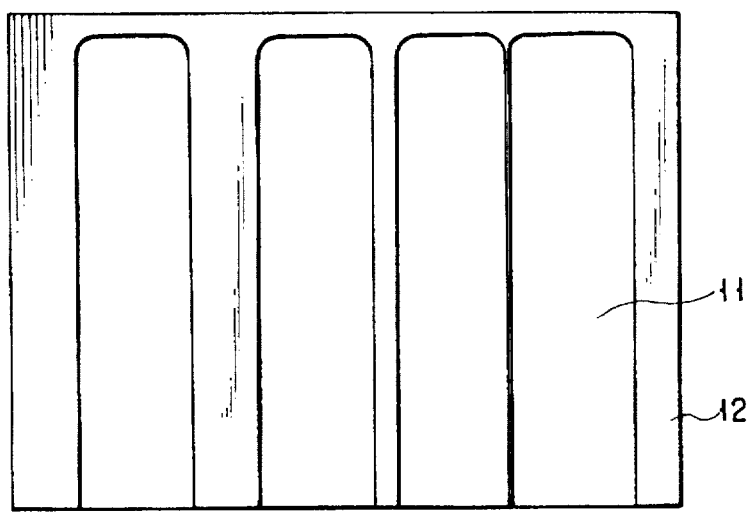
FIG. 11 is a plane view showing a processing state in a mask forming process in which a resin film is removed in a slit form to have a predetermined distance so as to strip a portion between the slits.
Figure 12:
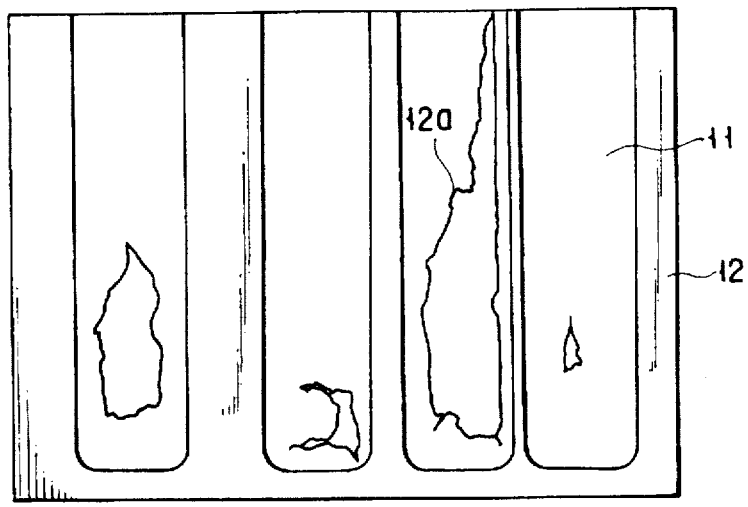
FIG. 12 is a plane view showing a mask forming process in the wide range of the resin film is directly removed with a laser beam.

Specifically, as shown in FIG. 11, the resin film 12 is removed in the slit form with the laser beam. Then, the resin film 12 between the slits 12b is stripped so as to be removed. Thereby, the etching mask is formed on the copper film layer 11 so as to provide the etching process to form the pattern. On the other hand, as shown in FIG. 12, the removing portion of the resin film 12 is directly irradiated with the laser beam so as to be removed. Thereby, the etching mask is formed so as to provide the etching process to form the pattern. As compared with the latter case, in the former case, the etching residual portion of the copper film layer 11 due to the re-adhesion portion 12a of the removed resin film 12 is little left.

If the copper foil is used as the copper film layer 11, the width of the copper foil put on the market is limited to about 600 mm. Then, if the diameter of the reflector is enlarged, a seam is often generated. To avoid this problem, the copper film layer 11 is formed on the skin material 10. Then, the resin film 12 is formed on the copper film layer 11 so as to be etched in accordance with a predetermined pattern shape, thereby forming the copper film layer pattern. Under this state, there is formed an auxiliary resin film 40, which is formed by coating the skin material including the resin film 12 with the strippable resin (FIG. 13). Then, as shown in FIG. 14, the resin film 12 on the copper film layer 11 is removed with the auxiliary resin film 40. Thereafter, a seam 11a formed at the copper film layer 11 is coated with, e.g., conductive paint, so as to form an auxiliary copper film 41 (FIG. 15). Thereafter, as shown in FIG. 16, the auxiliary resin film 40 on the skin material 10 is removed, so that the copper film layers 11 are continuously formed through the auxiliary copper film 41.

The above-mentioned embodiment explained the case in which the present invention was applied to the dual grid reflector having the linear copper film layer pattern. However, the present invention is not limited to the above embodiment. For example, as shown in FIGS. 17 and 18, the present invention can be applied to a frequency selective reflector (FSR). The FSR is formed of a large number of ring-shaped copper film layer patterns to have a predetermined distance. Each of the patterns is formed of the copper layer 31 of the skin material 30 of the reflector body. The copper film layer patterns are not limited to the ring-shape. The shape can be appropriately set in accordance with a frequency to be used, etc. Similar to the dual grid reflector, the etching mask forming process using the laser beam, and the etching process are executed so as to form the FSR.

In the above-mentioned embodiment, the copper film layer 11 was formed of copper foil as a metal film layer. However, in the present invention, for example, the copper film layer 11 can be replaced by a layer made of other metal such as aluminum, or the like, is formed on the skin material 10 by plating, spattering, vapor-deposition, or the like. Then, the resin film 12 is formed on the metal film layer. Thereafter, the resin film 12 is removed with the laser beam, forming an etching mask on the metal film layer. Thereby, the metal film layer pattern can be formed. Also, the auxiliary copper film 41 can be replaced by a film made by other metal such as aluminum.

The above-mentioned embodiment explained the case in which the copper film layer pattern was formed on the skin material 10 and the skin material 10 was adhered to the honeycome core so as to form the reflector body. However, in the present invention, for example, the skin material 10 is adhered to the honeycome core so as to form the reflector body. Thereafter, the resin films 12 are sequentially formed. Then, the resin films 12 are removed with the laser beam, and the etching process is provided so that the copper film layer pattern can be formed.

The above-mentioned embodiment explained the case in which a an ultraviolet laser beam was used to remove the resin film 12. However, in the present invention, various kinds of laser beams such as a visible laser beam, and an infrared laser beam, etc., can be used.

In the case of using the visible laser beam, the infrared laser beam, it is necessary to consider the importance of the optical characteristic of the resin film 12. Specifically, the resin film 12 having a high absorptance to the wavelength of the using laser beam must be utilized. As an example of the optical characteristic of the resin film 12, FIG. 7 shows the characteristic of Plasticoat MR made by Daikyo Kagaku, and FIG. 8 shows the characteristic of Plasticoat #100 made by the same.

It is assumed that a SHG-YAG laser beam (wavelength of 532 nm) having high practical use is utilized as a laser beam source. It is difficult to process Plasticoat #100 to be removed since the absorptance of plasticoat #100 to the wavelength of 532 nm is only about 20%. On the other hand, the absorptance of plasticoat MR to the wavelength of 532 nm is 90% or more. Therefore, the laser beam can be efficiently absorbed into Plasticoat MR, serving as the resin film 12, so that Plasticoat MR can be processed well to be removed.

In the case of the ultraviolet laser beam having the wavelength of 280 nm or less, all kinds of resin films 12 can absorb the ultraviolet laser beam of substantially 100%. However, in the case of the visible or infrared laser beam, the resin film 12 having a high absorptance to the wavelength of the using laser beam must be utilized.

Figure 19:
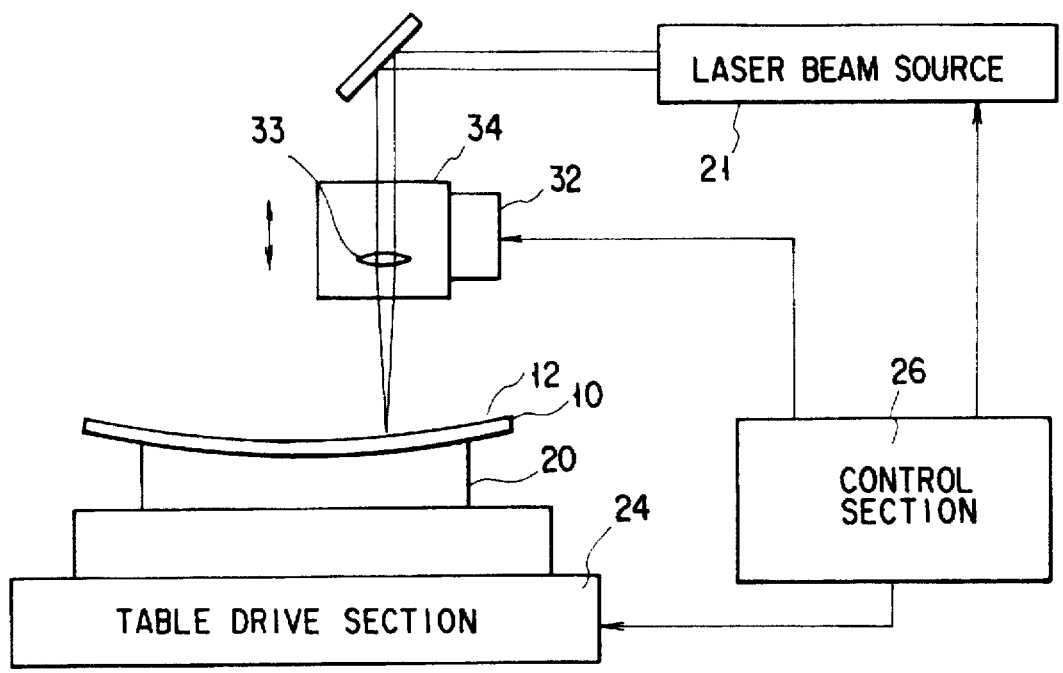
FIG. 19 is a block plan showing a converging optical system for radiating a laser beam onto a resin film according to the other embodiment of the present invention.

In the explanation of the above-mentioned embodiment, the laser beam irradiation section 22 was formed of the telecentric optical system. Then, the laser beams sent from the laser beam source 21 were converted to laser beams which are substantially parallel to each other. However, the present invention is not limited to the above embodiment. As shown in FIG. 19, the laser beam irradiation section 34 may be formed of a converging optical system 33 in place of the telecentric optical system. The laser beams sent from the laser beam source 21 are converged by the laser beam irradiation section 34. Then, the resin film 12 on the skin material 10 may be irradiated with the converged laser beam. In this case, the optical system drive section 32 of the laser beam irradiation section 34 is moved in the direction of an optical axis by the control section 26, so that the laser beam sent from the laser beam source 21 is converged on the resin film 12.

Figure 20:
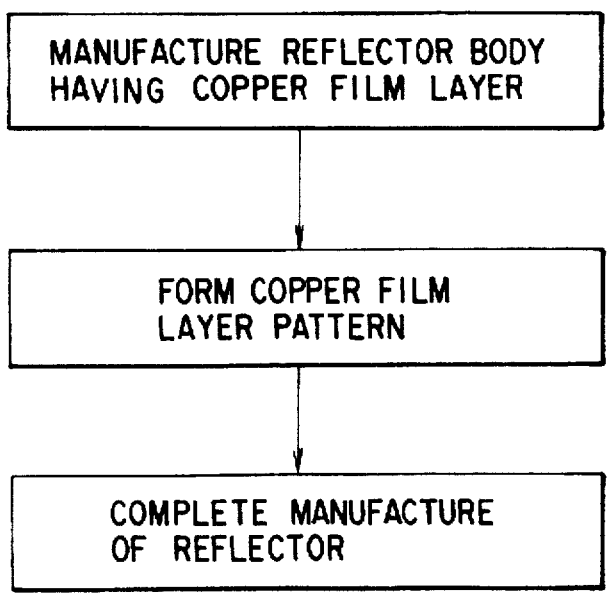
FIG. 20 is a flow chart showing the manufacturing method of the reflector of the other embodiment of the present invention.

Moreover, the present invention may be manufactured by the steps shown in FIG. 20. Specifically, in the first step, the reflector body is formed of an insulation substrate so as to be shaped like a reflector surface. Then, the metal film layer such as a copper film layer is formed on its reflective surface. In the second step, the metal film layer of the reflector body is directly irradiated with the ultraviolet laser beam such as KrF excimer laser so as to be removed. Thereby, a predetermined metal film layer pattern is formed. Accordingly, the metal film layer pattern can be formed without providing the masking process and the etching process. Thereby, the reflector can be rapidly manufactured.

In forming the metal film layer pattern with the direct irradiation of the ultraviolet laser beam, the metal film area may be irradiated with the ultraviolet laser beam to have a predetermined space. Then, the metal film between the portions irradiated with the ultraviolet laser beam is removed so as to minimize the laser beam irradiation area. Thereby, the large area of the metal film layer can be removed.

In forming the copper film layer pattern with the direct irradiation of the ultraviolet laser beam, the laser beam irradiation section and the reflector body are three-dimensionally controlled, so that the copper film layer pattern can be formed.

The present invention can be, of course, variously modified without deviating the gist of the invention.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for manufacturing a reflector comprising:

a first step of forming a skin material having a curved reflective surface of a main body of the reflector, wherein said skin material is formed of an insulation substrate and forming a metal film layer on said reflective surface of said skin material;

a second step of applying peelable resin onto the metal film layer of said reflective surface so as to form a resin film;

a third step of irradiating said resin film on said metal film layer with a laser beam to remove said resin film along respective lines of an outline of a metal film layer pattern on said metal film layer, and peeling said resin film from said metal film layer other than from an area of said metal film layer pattern on said metal film layer so as to mask said metal film layer pattern with said resin film;

a fourth step of etching off said metal film layer other than from said area of said metal film later pattern; and a fifth step of peeling said resin film covering the metal film layer pattern of said reflective surface etched in said fourth step so as to expose said metal film layer pattern.

2. The method according to claim 1, wherein, in said fifth step, an auxiliary resin film is formed on said reflective surface including said resin film covering said metal film layer pattern etched in said fourth step, the resin film on said metal film layer pattern covered with said auxiliary resin film along with said auxiliary resin film is peeled to expose the metal film layer, and a film omitting portion of said metal film layer pattern is coated with an auxiliary metal film.

3. The method according to claim 2, wherein said laser beam is a visible laser beam or an ultraviolet laser beam.

4. The method according to claim 1, wherein said laser beam is a visible laser beam or an ultraviolet laser beam.

5. A method for manufacturing a reflector comprising:

a first step of forming a skin material, having a curved reflective surface of a main body of the reflector, wherein said skin material is formed of an insulation substrate and forming a metal film layer on said reflective surface of said skin material; and a second step of irradiating said resin film on said metal film layer with a laser beam to remove said resin film, along respective lines of an outline of a metal film layer pattern, on said metal film layer and peeling said resin film from said metal film layer other than from an area of said metal film layer pattern, on said metal film layer so as to form a metal film layer pattern on said reflection surface.

6. The method according to claim 5, wherein said laser beam is an ultraviolet laser beam.

* * * * *